US007928927B1

(12) United States Patent
Krenz et al.

(10) Patent No.: US 7,928,927 B1
(45) Date of Patent: Apr. 19, 2011

(54) HEAD WORN HEAD UP DISPLAY SYSTEM

(75) Inventors: Michael J. Krenz, Cedar Rapids, IA (US); Charles B. Dirks, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 653 days.

(21) Appl. No.: 12/077,299

(22) Filed: Mar. 17, 2008

(51) Int. Cl.
G09G 3/02 (2006.01)
(52) U.S. Cl. .............. 345/8; 345/7; 345/9; 345/633
(58) Field of Classification Search ............ 345/8, 7, 345/9, 633
See application file for complete search history.

(56) References Cited

U.S. PATENT DOCUMENTS

| | | | | |
|---|---|---|---|---|
| 4,028,725 A | * | 6/1977 | Lewis | ............ 348/115 |
| 5,742,264 A | * | 4/1998 | Inagaki et al. | ............ 345/8 |
| 6,157,291 A | | 12/2000 | Kuenster | |
| 6,629,076 B1 | * | 9/2003 | Haken | ............ 704/271 |
| 2006/0215244 A1 | | 9/2006 | Yosha | |
| 2008/0002262 A1 | | 1/2008 | Chirieleison | |

* cited by examiner

Primary Examiner — Richard Hjerpe
Assistant Examiner — Olga Merkoulova
(74) Attorney, Agent, or Firm — Matthew J. Evans; Daniel M. Barbieri

(57) ABSTRACT

A head worn head up display (HUD) system providing an enhanced head down view in an environment including a head worn device including a vision tracking device and a dynamic head down display. The head worn HUD system includes a computational platform for receiving vision tracking device signals from a vision tracking device of a head worn device and for generating head down display signals associated with a dynamic head down display. The computational platform processes and utilizes the vision tracking device signals and the generated head down display signals to provide output signals to the head worn device for output by the head worn device as superimposed visual steering cues to the operator.

20 Claims, 3 Drawing Sheets

US 7,928,927 B1

HEAD WORN HEAD UP DISPLAY SYSTEM

BACKGROUND OF THE INVENTION

1. Field of the Invention

The present invention generally relates to the field of display systems, and particularly to a head worn head up display (HUD) for providing an enhanced head down environment.

2. Description of the Related Art

Effective flight management of aircraft is closely related to providing accurate and timely information to the pilot. This should be done in a manner that succinctly but accurately conveys to the pilot information important to the safe operation of the aircraft.

A principal flight instrumentation display is a dynamic head down display, also known as the Primary Flight Display (PFD), which shows information about course, speed, altitude, rate of climb and other information. The PFD is usually an electronic display such as a cathode ray tube or back-lit liquid crystal display.

Because of the already crowded and busy nature of the PFD screen, it is difficult to add new information in a manner that can be easily and quickly grasped by the pilot. In general, the new information almost always has to be placed in an already defined field on the display. However, it cannot replace unrelated essential information. For example, more detailed navigation information cannot be placed in the display area reserved for a different category of information such as speed, altitude, heading, etc.

A Head Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

As noted above, within a constrained cockpit environment, there is a very high density of controls to interact with and monitor. Traditional HUDs with combiners hung from the ceiling or mounted atop the glareshield can only be used when the user's eye is within the design eye box which is typically quite small (4"×2"×4" is typical). It can be very difficult for the user to simultaneously use the traditional HUD and also continue to utilize the remainder of the head down instrumentation.

Head Worn Head Up Displays have been in use in many environments, including military flight environments, for many years. Such head worn displays are also referred to as Head Mounted displays. The symbology used on these displays has included flight guidance information, weapon aiming and status information, and even some aircraft status information. A key aspect of previous usage is that most of the symbology was designed for use with the pilot looking outside of the cockpit. Present assignee, Rockwell Collins, Inc. manufactures several models of head worn head up displays. These models include the ProView SO35, ProView XL50, PV40/50STm, SIM EYE XL100A, ProView V035, and ProView SO35-A.

As will be disclosed below, the present invention provides a synergistic result by utilization of the head down display in combination with the head up display.

SUMMARY OF THE INVENTION

In a broad aspect, the present invention is a head worn head up display (HUD) system providing an enhanced head down view in an environment including a head worn device including a vision tracking device and a dynamic head down display. The head worn HUD system includes a computational platform for receiving vision tracking device signals from a vision tracking device of a head worn device and for generating head down display signals associated with a dynamic head down display. The computational platform processes and utilizes the vision tracking device signals and the generated head down display signals to provide output signals to the head worn device for output by the head worn device as superimposed visual steering cues to the operator.

Thus, the present system utilizes the conformal head worn HUD as an enhanced alerting device to more rapidly and accurately alert the user to situations through the use of visual steering cues to the problem indication and/or solution.

The benefits of using a head worn head up display can be significantly enhanced by combining its unique visual emphasis and cueing capabilities with imagery displayed on head down displays.

Further enhancement of its visual emphasis and cueing benefits may be realized when the user is looking at fixed objects within the cockpit as well. Cueing may be coarse in nature by providing directional cues towards objects of interest, or fine in nature by providing geometric bounding shapes around objects of interest.

BRIEF DESCRIPTION OF THE DRAWINGS

The same elements or parts throughout the figures of the drawings are designated by the same reference characters.

DETAILED DESCRIPTION OF THE INVENTION

Figure 1:
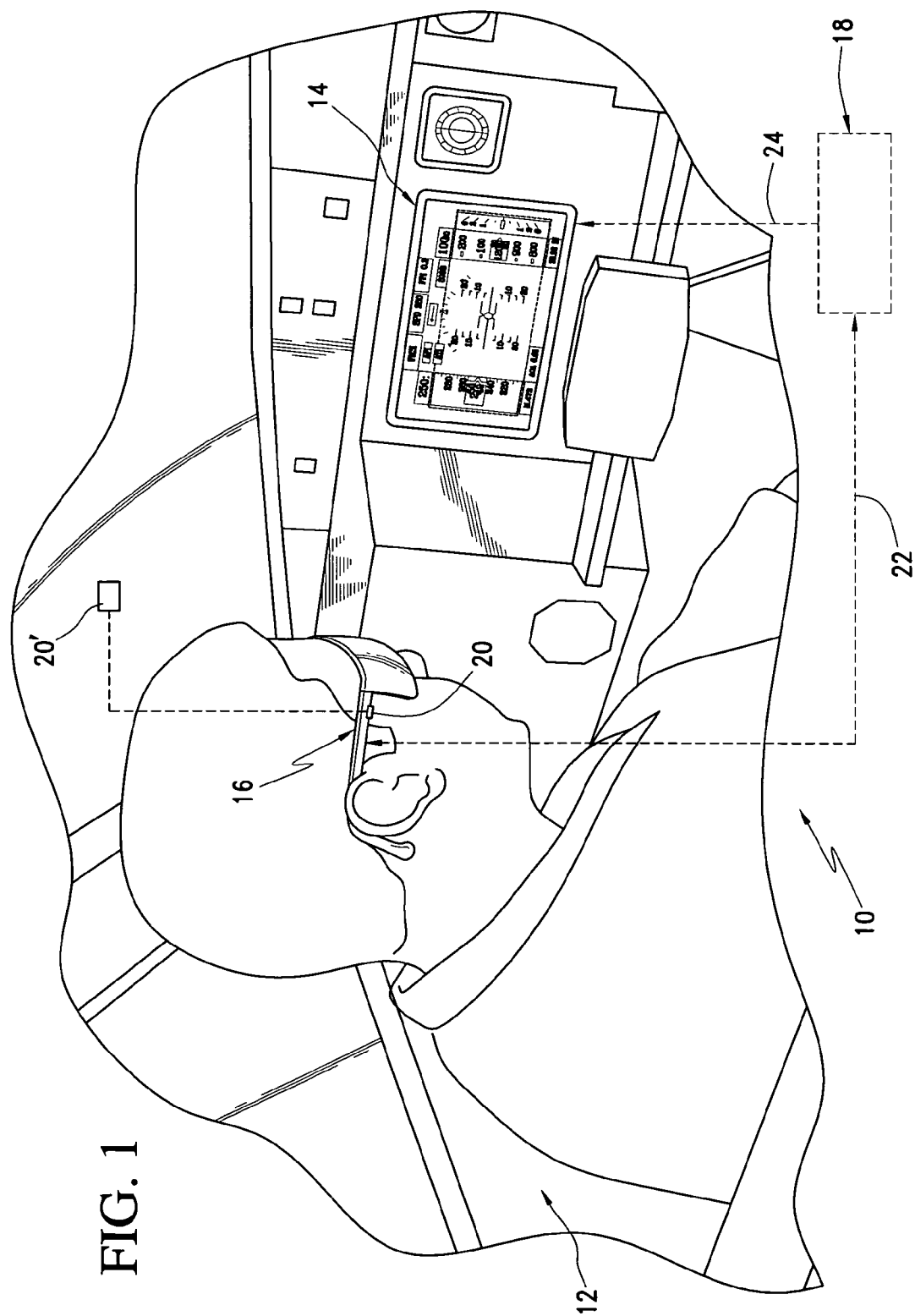
FIG. 1 is a schematic representation of the head worn head up display system of the present invention, illustrated by the showing of a user viewing a head down display while utilizing a head worn device.

Referring now to the drawings and the characters of reference marked thereon, FIG. 1 illustrates a preferred embodiment of the head worn head up display system for a vehicle, of the present invention, designated generally as 10. In this preferred embodiment the head worn head up display system 10 is shown relative to an aircraft cockpit, designated generally as 12. The display system includes a dynamic head down display 14, a head worn device 16, and a computational platform 18. The dynamic head down display 14 may be, for example, a primary flight display (PFD) for the aircraft. The head worn device (i.e. head mounted display) 16 includes a vision tracking device 20, 20'. The head worn device 16 may be, for example, similar to a device mentioned above, manufactured by Rockwell Collins, Inc. such as the ProView SO35, ProView XL50, PV40/50STm, SIM EYE XL100A, ProView V035, or ProView SO35-A. The head worn head up device 16 provides imagery to the user superimposed on the directly perceived "real world" image seen through the device 16. The vision tracking device may include a head tracking device for providing the vision tracking device signals in the form of coarse tracking signals and/or an eye tracking device for providing the vision tracking device signals in the form of fine tracking signals. Head tracking may be accomplished via many different and evolving means. These means may include, for example, infrared position sensors, magnetic sensors, and inertial attitude tracking sensors. Head tracking only provides coarse information as to where the user may be looking at any given time. Vision tracking techniques generally utilize cameras focused on the pupils of the user. These cameras can be mounted on the head worn device 16 or external to the device within visual range of the user.

The computational platform 18 receives vision tracking device signals 22 from the vision tracking device of the head worn device and generates head down display signals 24 associated with the dynamic head down display 14. The computational platform 14 processes and utilizes the vision tracking device signals 22 and the generated head down display signals 24 to provide output signals to the head worn device 16 for output by the head worn device 16 as superimposed visual steering cues to the operator.

Figure 2A:
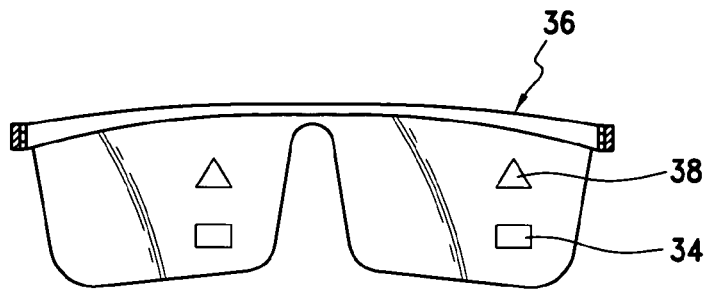
FIG. 2A is a perspective illustration of a head worn device including symbology shown thereon.
Figure 2B:
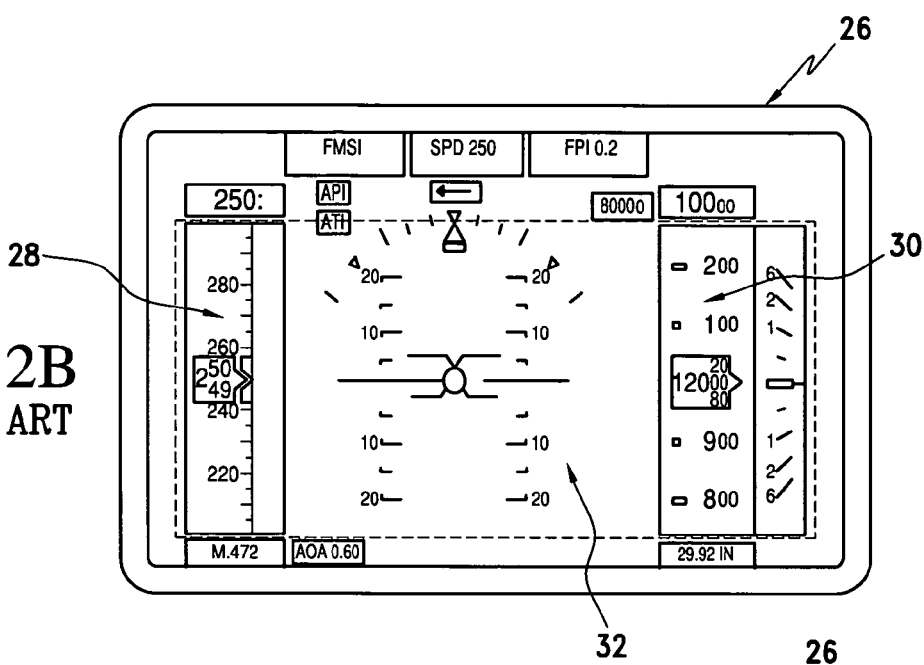
FIG. 2B (Prior Art) shows a head down display of an aircraft cockpit.

Referring now to FIG. 2B, an example of a (head down) primary flight display (PFD) is illustrated, designated generally as 26. A typical PFD may display a variety of information. For example, the PFD illustrated in this figure contains an airspeed tape 28, an altitude tape 30, and a sky/ground ball 32.

The computation platform 14 must have awareness or knowledge of the head down display content as it relates to any cues that may be generated on the head up display. For instance, if the head down display contains the altitude tape, and an alert cue is desired to be superimposed on the altitude tape, the computational platform 14 would know (1) the altitude tape is displayed, (2) the location of the altitude tape, (3) location of a specific parameter on the altitude tape, and (4) what type of cue is to be provided. The generated head down display signals 24 should include metafile type knowledge of what is displayed and where it is displayed.

Figure 2C:
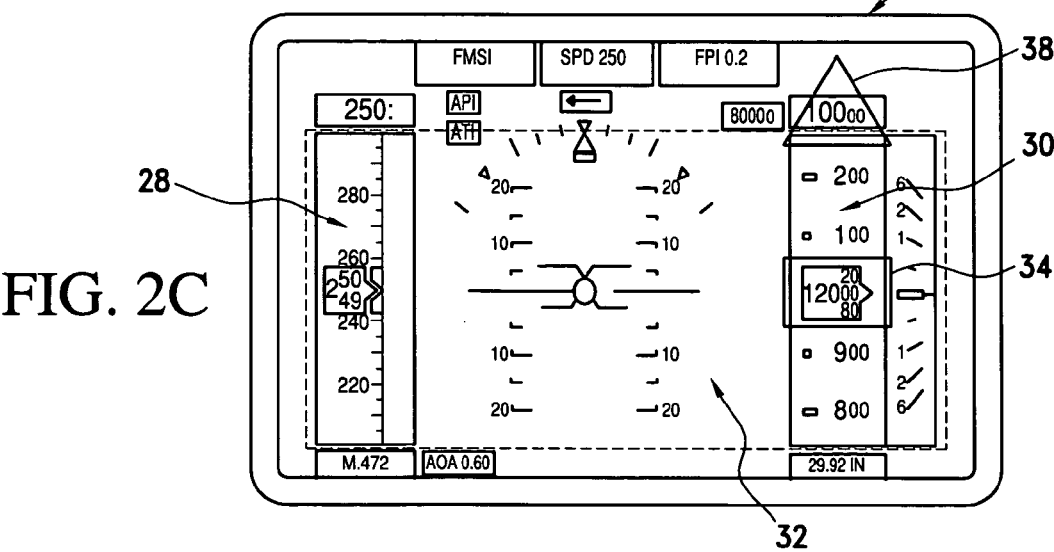
FIG. 2C shows a view of the head down display as looking through the head worn device showing the superimposed steering cues on salient portions of the head down display.

The superimposed visual steering cues to the operator may be in the form of a variety of symbols. Referring now to FIG. 2A, in operation of the present invention, if, for example, a deviation in the current altitude is reached, a warning, i.e. in this case a highlighted rectangle 34, on the head worn device 36 is presented. As shown in FIG. 2C, since the operator is looking at the PFD 26 the rectangle 34 is superimposed on the currently viewable current altitude portion of the altitude tape 30. Similarly, another selected highlighted geometric symbol, i.e. a triangle 38, may be superimposed in the selected altitude portion of the altitude tape 30.

Figure 3A:
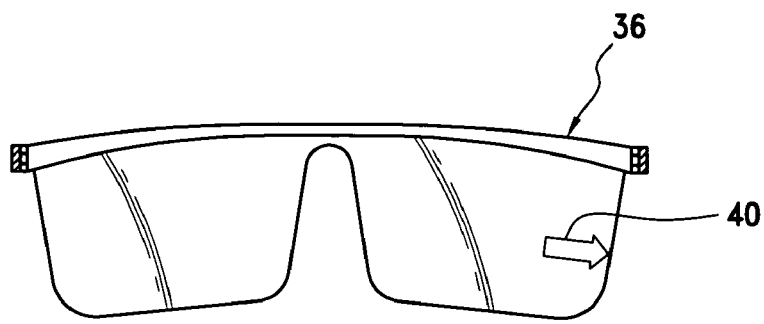
FIGS. 3A-3D show examples of various types of steering cues.
Figure 3B:
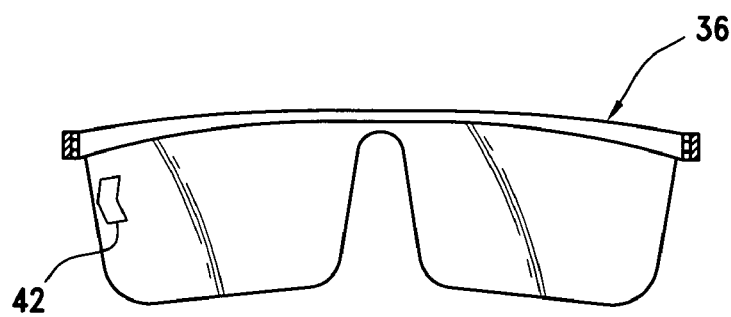
Figure 3C:
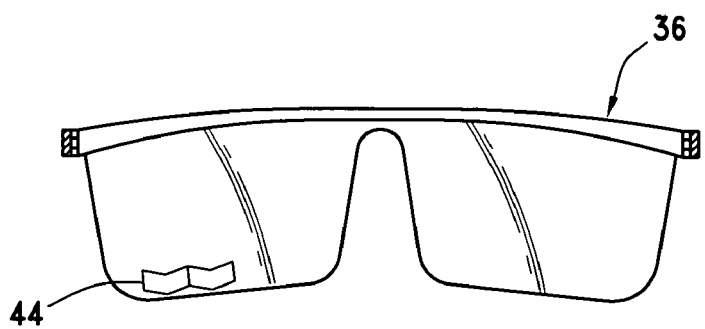
Figure 3D:
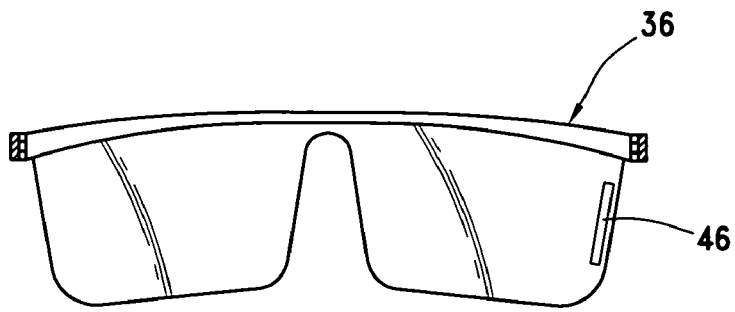

Preferably, if a salient location is in the currently viewable area, as in the previous examples, it is highlighted with a symbol such as a circle, square, triangle, etc. However, as can be seen in FIG. 3, if the location is currently outside of the viewable area, a border highlight 40 may be shown in the direction of the area to be monitored. As illustrated in FIG. 3A, the border highlight is an arrow 40 located on the periphery of the head worn device 36. Such peripheral border cues 40 generally appear at the edge of the visible space on the head worn device 36 closest to the object of interest that is currently not in the user's field of view. Where peripheral border cues are utilized they are likely to be "superimposed" on non-descript portions of the user's view. For example, the peripheral cues may be used when the user is looking out the window to draw his attention to the head down displays, or could be used to draw his attention to a different head down display than the one the user is presently viewing. There may be a number of peripheral border cues, as indicated by cues 42, 44, 46, by way of illustration, and not limitation, in FIGS. 3B-D. The double arrowed cue 44 may be used when the currently non-viewed object is a longer distance from view, as opposed to cue 42. That is, a double arrow may indicate a larger change in viewing angle than a single arrow. Cue 46 may be used if a very generic direction ("look to your right" as shown in FIG. 3D) is desired, or if it is necessary to minimize the size/shape of the cue. More than one steering cue can be presented on the head worn display at the same time.

Examples of use of the steering cues of the present invention, include, for example:

Warning highlights—If a cockpit warning is issued, the location inside the cockpit requiring attention is highlighted.

Checklist highlights—During the execution of checklists, the location of items to be checked is highlighted.

Bug Deviation highlights—If any "bugged parameter" (e.g. altitude, heading, airspeed, etc.) is deviated from, the symbology showing the deviation is highlighted. Additionally, this could include performance set exceedances like 250 Knots below 10,000 feet or bara changes in the non-standard international flight environment.

Deviation highlights—If any deviation occurs from the planned route of flight, the symbology showing the deviation is highlighted (e.g. localizer or glideslope deviation, or enroute deviation from flight plan).

Circuit Breaker associated with malfunction location on panel—If a circuit related malfunction occurs in the aircraft electrical system, then the head worn HUD could serve to direct the pilot specifically to the circuit location on the panel for fault mitigation.

Other embodiments and configurations may be devised without departing from the spirit of the invention and the scope of the appended claims.

The invention claimed is:

1. A head worn head up display (HUD) system providing an enhanced head down view in an environment including a head worn device including a vision tracking device and a dynamic head down display, said head worn HUD system, comprising:
a computational platform for receiving vision tracking device signals from a vision tracking device of a head worn device and for generating head down display signals associated with a dynamic head down display, said computational platform for processing and utilizing said vision tracking device signals and said generated head down display signals to provide output signals to said head worn device for output by said head worn device as superimposed visual steering cues to the operator.

2. The head worn HUD system of claim 1, further comprising a head worn device including a vision tracking device comprising a head tracking device for providing said vision tracking device signals in the form of coarse tracking signals.

3. The head worn HUD system of claim 1, further comprising a head worn device including a vision tracking device comprising an eye tracking device for providing said vision tracking device signals in the form of fine tracking signals.

4. The head worn HUD system of claim 1, further comprising a dynamic head down display for providing said head down display signals.

5. The head worn HUD system of claim 1, wherein said computational platform receives said head down display signals from an aircraft's dynamic head down display and said visual steering cues comprise symbology for use while looking inside of the cockpit.

6. The head worn HUD system of claim 5, wherein said symbology comprises:
   a) a highlighted conformal geometric symbol if a location is currently viewable; and,
   b) a non-conformal border highlight if a location is currently outside of the viewable area, said border highlight being shown in the direction of the area to be monitored.

7. The head worn HUD system of claim 6, wherein said border highlight is selected from the group of avionics system highlights, consisting of: warning highlights, checklist highlights, bug deviation highlights, navigation deviation highlights, and circuit breaker highlights.

8. The head worn HUD system of claim 1, further comprising supplemental input signals to said computational platform for providing supplemental alerts.

9. The head worn HUD system of claim 1, further comprising supplemental input signals to said computational platform for providing supplemental audio alerts.

10. A head worn head up display (HUD) system providing an enhanced head down view, comprising:
    a) head worn device including a vision tracking device for providing vision tracking device signals;
    b) a dynamic head down display for providing head down display signals; and,
    c) a computational platform for receiving said vision tracking device signals from said vision tracking device and for generating head down display signals associated with said dynamic head down display, said computational platform for processing and utilizing said vision tracking device signals and said generated head down display signals to provide output signals to said head worn device for output by said head worn device as superimposed visual steering cues to the operator.

11. The head worn HUD system of claim 1, wherein said head worn device includes a vision tracking device comprising a head tracking device for providing said vision tracking device signals in the form of coarse tracking signals.

12. The head worn HUD system of claim 1, wherein said head worn device includes a vision tracking device comprising an eye tracking device for providing said vision tracking device signals in the form of fine tracking signals.

13. The head worn HUD system of claim 1, wherein dynamic head down display is located in an aircraft and said visual steering cues comprise symbology for use while looking inside of the cockpit.

14. The head worn HUD system of claim 13, wherein said symbology comprises:
    a) a highlighted conformal geometric symbol if a location is currently viewable; and,
    b) a non-conformal border highlight if a location is currently outside of the viewable area, said border highlight being shown in the direction of the area to be monitored.

15. The head worn HUD system of claim 14, wherein said border highlight is of the set comprising: warning highlights, checklist highlights, bug deviation highlights, navigation deviation highlights, and circuit breaker highlights.

16. The head worn HUD system of claim 1, further comprising supplemental input signals to said computational platform for providing supplemental alerts.

17. The head worn HUD system of claim 1, further comprising supplemental input signals to said computational platform for providing supplemental audio alerts.

18. A method for providing an enhanced head down view in an environment including a head worn device including a vision tracking device and a dynamic head down display, said method comprising the step of:
    utilizing a computational platform for:
    i. receiving vision tracking device signals from a vision tracking device of a head worn device;
    ii. generating head down display signals associated with a dynamic head down display; and,
    iii. processing and utilizing said vision tracking device signals and said generated head down display signals to provide output signals to said head worn device for output by said head worn device as superimposed visual steering cues to the operator.

19. The method of claim 18, wherein said step of receiving vision tracking device signals comprises receiving coarse tracking signals from a head tracking device and fine tracking signals from an eye tracking device.

20. The method of claim 18, wherein said step of utilizing a computational platform comprises utilizing a computational platform positioned on an aircraft.

* * * * *